(12) United States Patent
Takeshita et al.

(10) Patent No.: US 11,381,465 B2
(45) Date of Patent: *Jul. 5, 2022

(54) NETWORK DESIGN DEVICE, NETWORK DESIGN METHOD, AND NETWORK DESIGN PROCESSING PROGRAM

(71) Applicant: NIPPON TELEGRAPH AND TELEPHONE CORPORATION, Tokyo (JP)

(72) Inventors: Erina Takeshita, Musashino (JP); Hideo Kawata, Musashino (JP); Shinichi Yoshihara, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/977,934

(22) PCT Filed: Feb. 28, 2019

(86) PCT No.: PCT/JP2019/007800
§ 371 (c)(1),
(2) Date: Sep. 3, 2020

(87) PCT Pub. No.: WO2019/172068
PCT Pub. Date: Sep. 12, 2019

(65) Prior Publication Data
US 2021/0044486 A1   Feb. 11, 2021

(30) Foreign Application Priority Data

Mar. 7, 2018 (JP) .............................. JP2018-041237

(51) Int. Cl.
*H04L 41/14* (2022.01)
*H04L 41/0826* (2022.01)
(Continued)

(52) U.S. Cl.
CPC ........ *H04L 41/145* (2013.01); *H04L 41/0826* (2013.01); *H04L 41/12* (2013.01); *H04L 47/125* (2013.01)

(58) Field of Classification Search
CPC ... H04L 41/145; H04L 41/0826; H04L 41/12; H04L 47/125
See application file for complete search history.

(56) References Cited

U.S. PATENT DOCUMENTS

2007/0053342 A1* 3/2007 Sierecki ................. H04L 45/10
370/351
2012/0213081 A1* 8/2012 Imai .................... H04L 41/0806
370/389
(Continued)

OTHER PUBLICATIONS

Erina Takeshita, Hideo Kawata. "Proposal of network design method to accommodate various paths." B-6-29, IEICE General Conference 2017. Mar. 20, 2017.

*Primary Examiner* — John A Follansbee
*Assistant Examiner* — Fadi Haj Said

(57) ABSTRACT

A network design apparatus, a network design method, and a network design processing program design a network configuration for a network in which a transfer apparatus is disposed at each of a plurality of communication hubs, and the communication hubs are connected via a link by a link portion apparatus in the transfer apparatus. In design of the network configuration, the optimal path candidates of each of the lines minimizing a total cost value in the overall network is calculated. In the calculation of the optimal path candidates of each of the lines, only a path candidate of each of the lines can be selected, and a combination candidate of link portion apparatuses for each of the links is derived uniquely from the selected path candidate of each of the lines.

9 Claims, 10 Drawing Sheets

(51) Int. Cl.
*H04L 41/12* (2022.01)
*H04L 47/125* (2022.01)

(56) References Cited

U.S. PATENT DOCUMENTS

| | | | |
|---|---|---|---|
| 2015/0023666 A1* | 1/2015 | Hashiguchi | H04L 41/145 398/79 |
| 2015/0085698 A1* | 3/2015 | Sella | H04L 41/5035 370/254 |
| 2017/0047999 A1* | 2/2017 | Wei | H04L 41/14 |

* cited by examiner

NETWORK DESIGN DEVICE, NETWORK DESIGN METHOD, AND NETWORK DESIGN PROCESSING PROGRAM

CROSS-REFERENCE TO RELATED APPLICATIONS

This application is a 371 U.S. National Phase of International Application No. PCT/JP2019/007800, filed on Feb. 28, 2019, which claims priority to Japanese Application No. 2018-041237 filed on Mar. 7, 2018. The entire disclosures of the above applications are incorporated herein by reference.

TECHNICAL FIELD

Embodiments of the present invention relate to a network design apparatus, a network design method, and a network design processing program.

BACKGROUND ART

In recent years, with the diversification of network services, the number of services has increased and the requirements of a network for the services have diversified. Examples of the requirements for the network include an inter-end delay, band assurance, and conditions regarding redundancy. With the increase in the number of services or the diversification of the requirements, a cost of equipment of the network has increased.

In order to curb the increase in cost, for example, a network design in which a plurality of lines possessed by each network service are efficiently accommodated in a common infrastructure network is performed in NPL 1. Accordingly, economy of the network is further improved. In a method of NPL 1, an infrastructure network accommodating lines having different requirements for an inter-end delay is designed. Here, in the infrastructure network to be designed, a transfer apparatus that processes traffic of a path is disposed, and an interface is installed as a link portion apparatus in a link portion of the transfer apparatus. In NPL 1, a disposition and capacity of a transfer apparatuses at which a total cost value of interfaces of all transfer apparatuses on the infrastructure network is minimized are derived in the design of the infrastructure network. Therefore, in the design of the infrastructure network, a design of a path accommodating each line and an equipment design for designing the disposition or capacity of the transfer apparatus on the infrastructure network are performed simultaneously.

An overall flow in a process performed in NPL 1 is illustrated in FIG. 1. In a design of a network as in NPL 1, each line needs to be accommodated in a path satisfying requirements for an inter-end delay. Therefore, in S'1, path candidates satisfying the requirements for the inter-end delay are calculated for each line, and a set of path candidates satisfying the requirements described above is a path candidate set, as illustrated in FIG. 1. The path candidate set consists of path candidates satisfying the requirements described above, and consists of the number of path candidates equal to or smaller than a designated number of path candidates. Here, the number of path candidates is a design parameter, and is designated by a designer.

Further, in NPL 1, an interface combination candidate is calculated, and the calculated combination candidate set is used as an interface combination candidate set in S'2. In this case, combination candidates of interfaces that can be installed in the link portion of the transfer apparatus at each communication hub on the infrastructure network are calculated. The combination candidate set includes combination candidates of interfaces that can be installed in the link portion according to the designated number of interface combination candidates. Here, the number of combination candidates is a design parameter and is designated by a designer. Further, each of the interface combination candidates is a combination of zero or more interfaces. Further, a certain interface combination candidate among the interface combination candidates may include the same type of interfaces.

In NPL 1, a total cost value of all the interfaces on the infrastructure network is used as an objective function, and an optimization problem in which an optimal network configuration for minimizing the objective function is derived is solved in S'3. A mathematical relationship obtained by formulating this optimization problem is shown below.

[Math. 1]

$$\operatorname*{argmin}_{\vec{x}, \vec{y}} 2 \sum_{e \in E} \sum_{j \in J} y_j^e \cdot \Omega_j^{IF} \quad (1)'$$

subject to, $$\sum_{i \in I^v} x_i^v = 1, \forall v \in V \quad (2)'$$

$$\sum_{j \in J} y_j^e = 1, \forall e \in E \quad (3)'$$

$$y_j^e \cdot \Psi_j^{IF} \geq t^e(\vec{x}, \vec{d}, M) \forall e \in E \quad (4)'$$

Further, matters indicated by, for example, parameters relevant to relationships (1)' to (4)' are as follows.

[Math. 2]
L=(l): Set of Communication hubs
E=(e): Set of inks between communication hubs
V=(v): Set of lines
$\vec{x} = (x_i^v)$: line v selects path candidate i
$\vec{y} = (y_j^e)$: Link e selects interface (IF) combination candidate j
$\Omega_j^{IF}$: cost value of IF combination candidate j
$I^v$: Path candidate set of line v
J: IF Combination candidate set
$\psi_j^{IF}$: Capacity of IF combination candidate j
$\vec{d} = (d_v)$: Contracted band of line v
M: Connection Matrix (indicated by |L|×|E|) indicating connection form between communication hubs
$t^e(\vec{x}, \vec{d}, M)$: Sum of contracted Bands of Link e (calculated on basis of $\vec{x}, \vec{d}$, M)

In the optimization problem of S'3, one path candidate is selected from the path candidate set for each line. For each line, conditions for selecting the path candidate from the path candidate set are shown in the relationship (2)'. Here, in the relationship (1)' to (4)', a variable x is a decision variable of the optimization problem. In each line, the variable x changes in correspondence to which path candidate has been selected from the path candidate set. Further, in the optimization problem, one combination candidate for a combination of interfaces is selected from the interface combination candidate set, for each link portion of the transfer apparatus, that is, for each link connecting each communication hub. For each link, conditions for selecting an interface combination candidate from a combination candidate set are shown in the relationship (3)'. Here, in the relationship (1)' to (4)', a variable y is a decision variable of the optimization problem. In each link portion, the variable y changes in correspondence to which interface combination candidate has been selected from the combination candidate set.

Further, in the optimization problem of S'3, capacity conditions of t4)' are provided. That is, in each link (each link portion), a total contracted band being equal to or smaller than a total capacity of all interfaces constituting the combination candidates is provided as the capacity conditions. Therefore, in the optimization problem, a combination candidate selected from an interface combination candidate set needs to satisfy the capacity conditions described above in each link.

In S'3, a total cost value of all interfaces on an infrastructure network shown in the relationship (1)' is used as an objective function, and an optimization problem for minimizing the objective function is solved. By solving the optimization problem, an optimal path candidate is determined from the path candidates satisfying the conditions of the relationship (2)' to (4)', and an optimal combination candidate is determined from the interface combination candidates satisfying the conditions of the relationship (2)' to (4)'.

In NPL 1, because the process is performed as described above, a network configuration with a smallest total cost value, that is, an optimal network configuration can be derived in an infrastructure network accommodating lines having different requirements for an inter-end delay. That is, for a network configuration including a path accommodating lines, and a disposition and capacity of each of transfer apparatuses and link portion apparatuses, an optimal network configuration can be derived from among a plurality of patterns.

CITATION LIST

Non Patent Literature

NPL 1: Erina Takeshita and Hideo Kawada, "Proposed Network Design Scheme Accommodating Various Paths", Electronics, Information and Communication Engineers General Conference B-6-29, 2017.

SUMMARY OF THE INVENTION

Technical Problem

In NPL 1 above, in S'3, both a path candidate of each line and an interface combination candidate of each link can be selected. Thus, in calculation of the optimization problem, a decision variable changing in correspondence to the selected path candidate is set for each line, and a decision variable changing in correspondence to the selected interface combination candidate is set for each link. That is, in the optimization problem, the decision variable set for each line and the decision variable set for each link described above are variables that can be changed. This increases the number of patterns of a network configuration that can be taken in the optimization problem. When the number of patterns of the network configuration that can be taken increases, that is, the number of patterns of options in the optimization problem increases, a search range is widened and derivation of an optimal solution takes time.

The present invention has been made with reference to the above circumstances, and provides a network design apparatus, a network design method, and a network design processing program capable of realizing a reduction in search range and shortening of a computation time in computation of an optimization problem and designing an optimal network configuration.

Means for Solving the Problem

To achieve the above object, a first aspect of the present invention is a network design apparatus for designing a network configuration for a network in which a transfer apparatus is disposed for each of a plurality of communication hubs and the communication hubs are connected via a link by a link portion apparatus in the transfer apparatus, the network design apparatus including: an input reception unit configured to receive an input of topology information on a connection state between the communication hubs, line information regarding a plurality of lines accommodated in the network, apparatus information regarding the transfer apparatus disposed at the communication hub and the link portion apparatus in the transfer apparatus, and design parameter information regarding parameters used in the design; a first processing unit including a calculation unit configured to calculate a path candidate set of each line on the basis of the topology information, the line information, and the design parameter information; a second processing unit including a calculation unit configured to calculate a combination candidate set of the link portion apparatuses on the basis of the apparatus information and the design parameter information; a third processing unit including a calculation unit configured to calculate an optimal path candidate of each line minimizing a total cost value in the overall network on the basis of a calculation result of the calculation unit of the first processing unit and a calculation result of the calculation unit of the second processing unit, the calculating of the optimal path candidate of each line including, at the calculation unit, enabling only the path candidate of each line to be selected, and uniquely deriving a combination candidate of the link portion apparatuses for each link from the selected path candidate of each line; and a generation unit configured to generate network configuration information reflecting both the optimal path candidate of each line calculated by the calculation unit of the third processing unit and the combination candidate of the link portion apparatus for each link uniquely derived from the optimal path candidate of each line by the calculation unit of the third processing unit.

A second aspect of the present invention is the network design apparatus according to the first aspect, wherein in the calculation of the optimal path candidate of each line, the calculation unit of the third processing unit calculates a total contracted band of each link on the basis of the line information, the topology information, and the selected path candidate of each line, and uniquely derives the combination candidate of the link portion apparatus for each link on the basis of the calculated total contracted band of each link.

A third aspect of the present invention is the network design apparatus according to the second aspect, wherein the calculation unit of the second processing unit calculates the combination candidate set of the link portion apparatus with different total capacities for each combination candidate, and the calculation unit of the third processing unit uniquely derives the combination candidate of the link portion apparatus for each link on condition that the total capacity of the link portion apparatus in the derived combination candidate for each link is equal to or greater than the calculated total contracted band, and that the total capacity of the link portion apparatus is smaller than the calculated total contracted band in a combination candidate with the total capacity of the link portion apparatus next smallest to the combination candidate derived in the combination candidate set for each link.

A fourth aspect of the present invention is a network design processing program for causing a processor to function as each unit of the network design apparatus according to any one of the first to third aspects.

A fifth aspect of the present invention is a network design method for designing a network configuration for a network in which a transfer apparatus is disposed for each of a plurality of communication hubs and the communication hubs are connected via a link by a link portion apparatus in the transfer apparatus, the network design method including: acquiring topology information on a connection state between the communication hubs, line information regarding a plurality of lines accommodated in the network, apparatus information regarding the transfer apparatus disposed at the communication hub and the link portion apparatus in the transfer apparatus, and design parameter information regarding parameters used in the design; calculating a path candidate set of each line on the basis of the topology information, the line information, and the design parameter information; calculating a combination candidate set of the link portion apparatuses on the basis of the apparatus information and the design parameter information; calculating an optimal path candidate of each line minimizing a total cost value in the overall network on the basis of on a calculation result for the path candidate set for each line and a calculation result for the combination candidate set of the link portion apparatus, the calculation of the optimal path candidate of each line including enabling only the path candidate of each line to be selected, and uniquely deriving a combination candidate of the link portion apparatuses for each link from the selected path candidate of each line; and generating network configuration information reflecting both the calculated optimal path candidate of each line and the combination candidate of the link portion apparatus for each link uniquely derived from the optimal path candidate of each line.

Effects of the Invention

According to the first to fifth aspects of the present invention, it is possible to select only path candidates of each line in an optimization problem in which an optimal path candidate of each line minimizing a total cost value in an overall network is calculated. In the optimization problem, a combination candidate of link portion apparatuses for each link is derived uniquely from selected path candidates for each line. Thus, in the optimization problem, only a variable indicating the path candidate selected in each line is a decision variable that can be changed, and the decision variables in the optimization problem is reduced. This allows the number of patterns in the configuration that the network can take to be reduced and a search range to be reduced. The reduction in the search range allows a computation time in the optimization problem to be shortened.

Accordingly, according to the first to fifth aspects of the present invention, it is possible to provide a network design apparatus, a network design method, and a network design processing program capable of realizing a reduction in search range and shortening of a computation time in computation of the optimization problem and designing an optimal network configuration.

Further, in the second and third aspects of the present invention, the total contracted band of each link is calculated from the path candidates of each line, and the interface combination candidate for each link is uniquely derived on the basis of the calculated total contracted band of each link. Thus, in the optimization problem, an appropriate interface combination candidate corresponding to the selected path candidate of each line is uniquely derived for each link.

Further, in the third aspect of the present invention, the interface combination candidates for each link are derived uniquely so that the conditions for the total contracted band described above are satisfied. Thus, in the optimization problem, the interface combination candidates for each link corresponding to the selected path candidate of each line are derived more appropriately.

DESCRIPTION OF EMBODIMENTS

Hereinafter, embodiments of the present invention will be described with reference to the drawings. An L2 switch is used as an example of a network apparatus in each embodiment. As a transfer apparatus, any network apparatus can be used as long as the network apparatus is an apparatus in which a link portion apparatus such as an interface can be installed as equipment within the network apparatus, in addition to the L2 switch. For example, in each embodiment, a router or the like is available as the network apparatus (transfer apparatus).

First Embodiment

In a first embodiment, a network configuration can be uniquely determined from selection of path candidates of each line. This can reduce a search range in optimization calculation.

Apparatus

Figure 1:
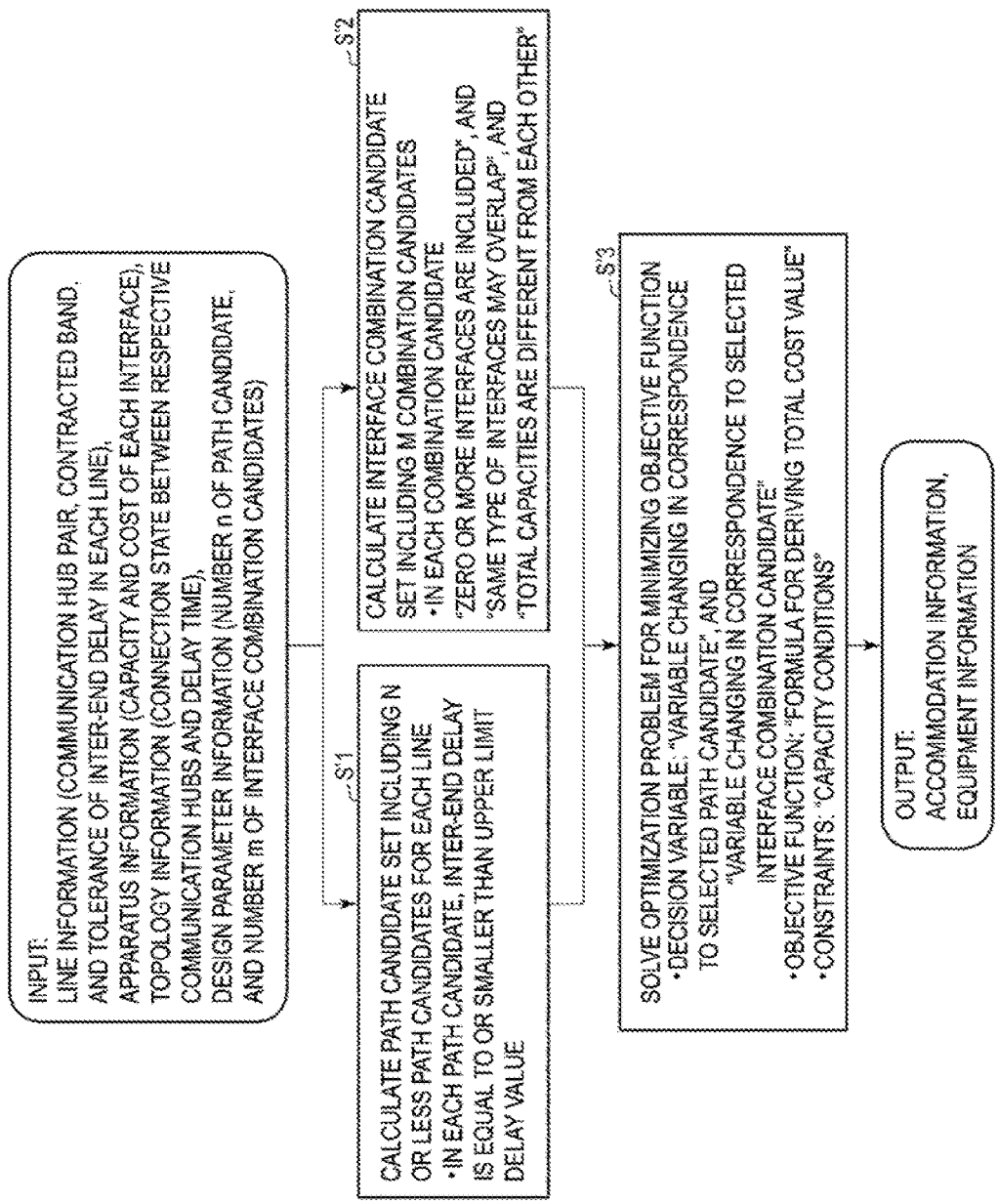
FIG. 1 is a flowchart illustrating an overall flow in a process performed in NPL 1.
Figure 2:
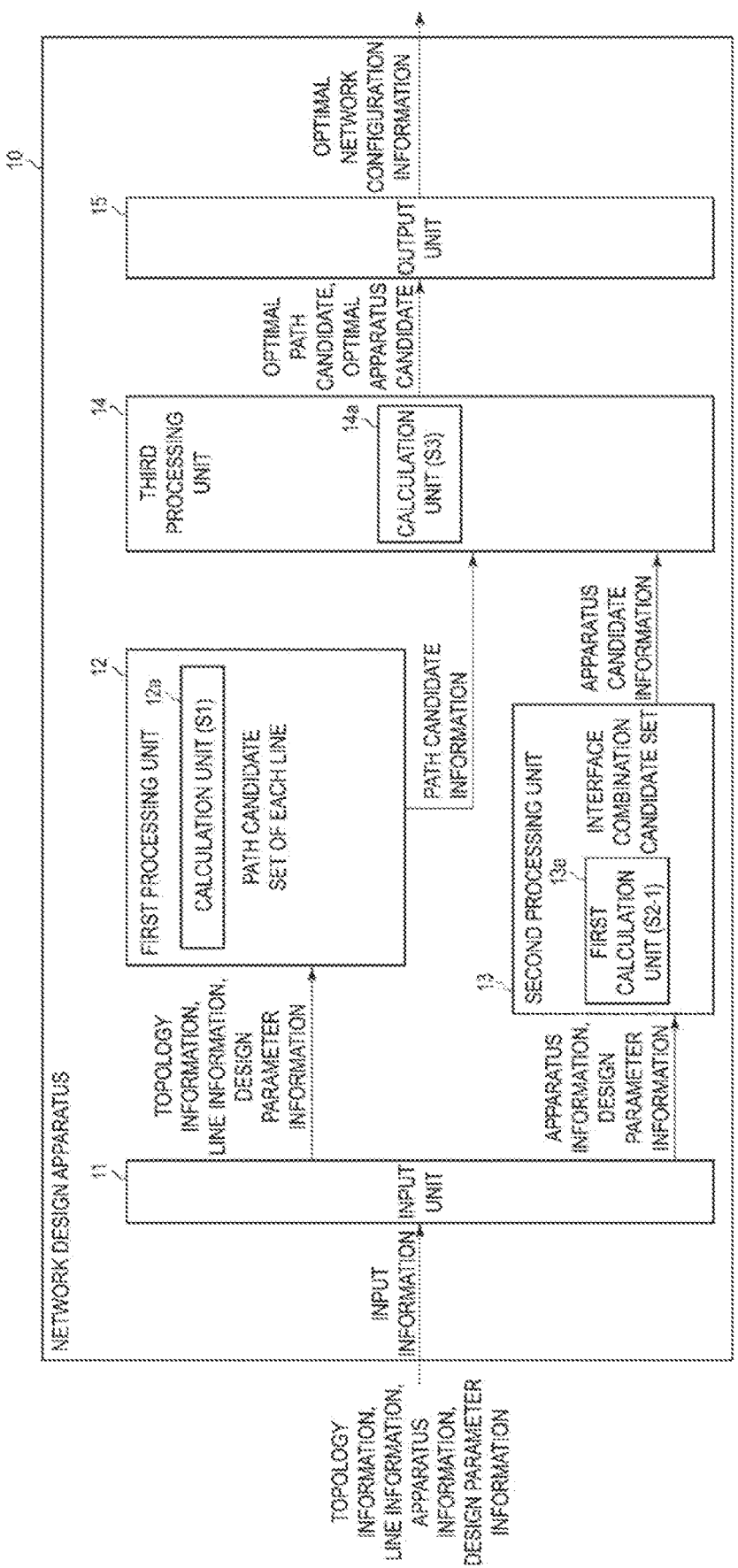
FIG. 2 is a block diagram illustrating an example of a network design apparatus according to a first embodiment of the present invention.

An example of a network design apparatus of the first embodiment is shown. FIG. 2 is a diagram illustrating an example of the network design apparatus according to the first embodiment of the present invention. The network design apparatus 10 outputs optimal network configuration information including optimal path information and optimal equipment information on the basis of input information. The network design apparatus 10 includes an input unit (input reception unit) 11, a first processing unit 12, a second processing unit 13, a third processing unit 14, and an output unit (generation unit) 15.

The first processing unit 12 includes a calculation unit 12a. The second processing unit 13 includes a calculation unit 13a. The third processing unit 14 includes a calculation unit 14a.

An input unit 11, which is an input reception unit, has a function of receiving input information input by a network designer, and outputting the input information to the first processing unit 12 and the second processing unit 13. The input information includes topology information, line information, apparatus information, and design parameter information. The topology information is information on a connection state between communication hubs on the infrastructure network. The line information is information on a plurality of lines accommodated in a network, and the plurality of lines are possessed by each network service. The apparatus information is information on a transfer apparatus disposed at each communication hub on the infrastructure network. Further, the apparatus information also includes information on a link portion apparatus such as an interface, which is installed on each transfer apparatus. The design parameter information is information on parameters that are used in design of a network.

The information including the topology information, the line information, and the design parameter information is input from the input unit 11 to the calculation unit 12a. The calculation unit 12a calculates a path candidate set from the information input from the input unit 11. The calculation unit 12a calculates the path candidate set of each line. The first processing unit 12 outputs the path candidate information including the path candidate set obtained by the calculation unit 12a. The path candidate information is output to the third processing unit 14.

Information including the apparatus information and the design parameter information is input from the input unit 11 to the calculation unit 13a. The calculation unit 13a calculates an interface combination candidate set from the information input from the input unit 11. The second processing unit 13 outputs apparatus candidate information including the interface combination candidate set obtained by the calculation unit 13a. The apparatus candidate information is output to the third processing unit 14.

The path candidate information is input from the first processing unit 12 to the calculation unit 14a, and the apparatus candidate information is input from the second processing unit 13 to the calculation unit 14a. The calculation unit 14a calculates an optimal path candidate from the path candidate information and the apparatus candidate information to be input. Further, the calculation unit 14a uniquely derives the interface combination candidate corresponding to the optimal path candidate from the optimal path candidate. That is, in the embodiment, the calculation unit 14a uniquely derives the optimal interface combination candidate from the optimal path candidate. The third processing unit 14 outputs the optimal path candidate determined by the calculation unit 14a to the output unit 15. Further, the third processing unit 14 outputs, to the output unit 15, an optimal apparatus candidate including the optimal interface combination candidate derived by the calculation unit 14a.

The optimal path candidate is input from the third processing unit 14 to the output unit 15, which is a generation unit. Further, the optimal apparatus candidate including the interface combination candidate corresponding to the optimal path candidate is input from the third processing unit 14 to the output unit 15. The output unit 15 generates network configuration information reflecting both the optimal path candidate and the interface combination candidate uniquely derived from the optimal path candidate on the basis of information input from the third processing unit 14. The output unit 15 outputs, as optimal network information, the network configuration information reflecting the optimal path candidate and the optimal interface combination candidate to a terminal apparatus that is operated by a network designer. The optimal network configuration information includes information on an optimal path accommodating each line and optimal equipment information regarding a switch and an interface disposed at each communication hub. The optimal equipment information includes information regarding an optimal disposition of switches and interfaces and optimal capacity of the switches and the interfaces. The output unit (generation unit) 15 may store the generated optimal network information in a storage medium or the like instead of being output to the terminal apparatus or the like.

Input Information

In the first embodiment, an example of the input information input to the input unit 11 of the network design apparatus 10 is shown. The input information is information input to the input unit 11 by a network designer. The input information that the network designer inputs to the input unit 11 of the network design apparatus 10 includes: (1) the topology information; (2) the line information; (3) the apparatus information; and (4) the design parameter information.

(1) The topology information includes (1-1) a connection matrix indicating a connection state between the communication hubs in the infrastructure network, and (1-2) a delay time in a link between the communication hubs.

(2) The line information includes (2-1) a starting point and an ending point of communications in each line, (2-2) a contracted band in each line, and (2-3) a tolerance of the inter-end delay in each line. (2-1) The starting point and the ending point of the communication in each line indicates a pair of communication hubs serving as end points of the line.

(3) The apparatus information includes information on each switch and information on each interface, and each interface constitutes a link portion apparatus in a switch disposed at the communication hub. The information on each interface includes (3-1) a traffic capacity of each interface and (3-2) a cost value of each interface.

(4) The design parameter information includes (4-1) the number of path candidates (an upper limit value of the number of path candidates) per line, and (4-2) the number of interface combination candidates (a design value of the number of combination candidates).

Overview of Overall Flow and Each Process

Figure 3:
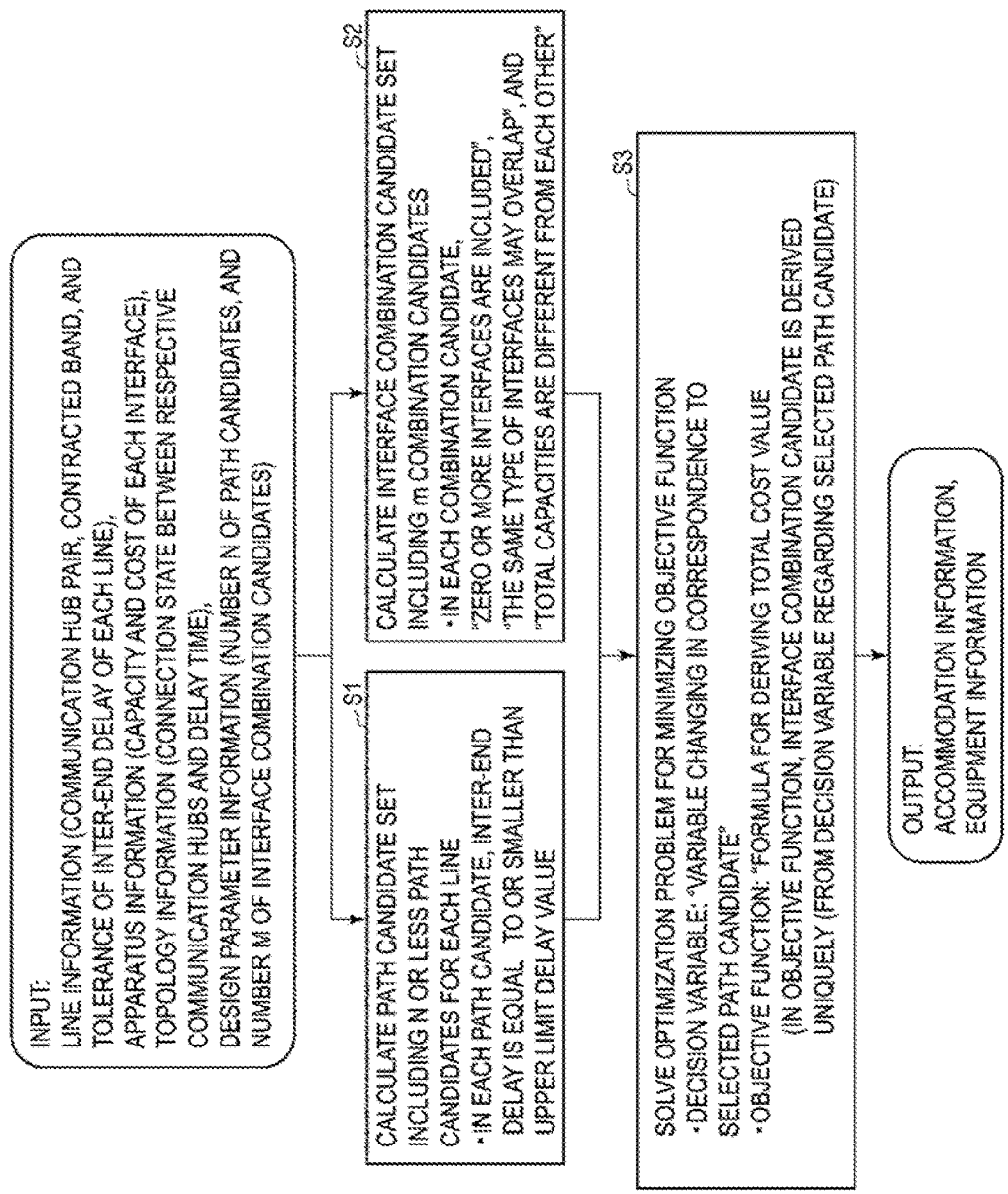
FIG. 3 is a flowchart illustrating an operation example procedure of the network design apparatus according to the first embodiment.

FIG. 3 is a flowchart illustrating an operation example procedure of the network design apparatus according to the first embodiment.

In S1, the calculation unit 12a of the first processing unit 12 calculates the path candidate set of each line. In S1, the calculation unit 12a calculates, for each line, an upper limit delay value, which is a threshold value for an inter-end delay. The calculation unit 12a calculates the path candidate set on the basis of the calculated upper limit delay value.

In S2, the calculation unit 13a of the second processing unit 13 calculates an interface combination candidate set.

S3 is performed on the basis of calculation results in S1 and S2 after S1 and S2. In S3, the calculation unit 14a of the third processing unit 14 calculates an optimal path candidate accommodating each line, and a combination candidate for an optimal interface disposed in the switch at each communication hub. The optimal network configuration is calculated on the basis of the optimal path candidates and the optimal interface combination candidates, that is, on the basis of calculation results in S3.

Details of Each Process

Next, details of S1 to S3 will be described.

Calculation of Path Candidate Set (S1)

Figure 4:
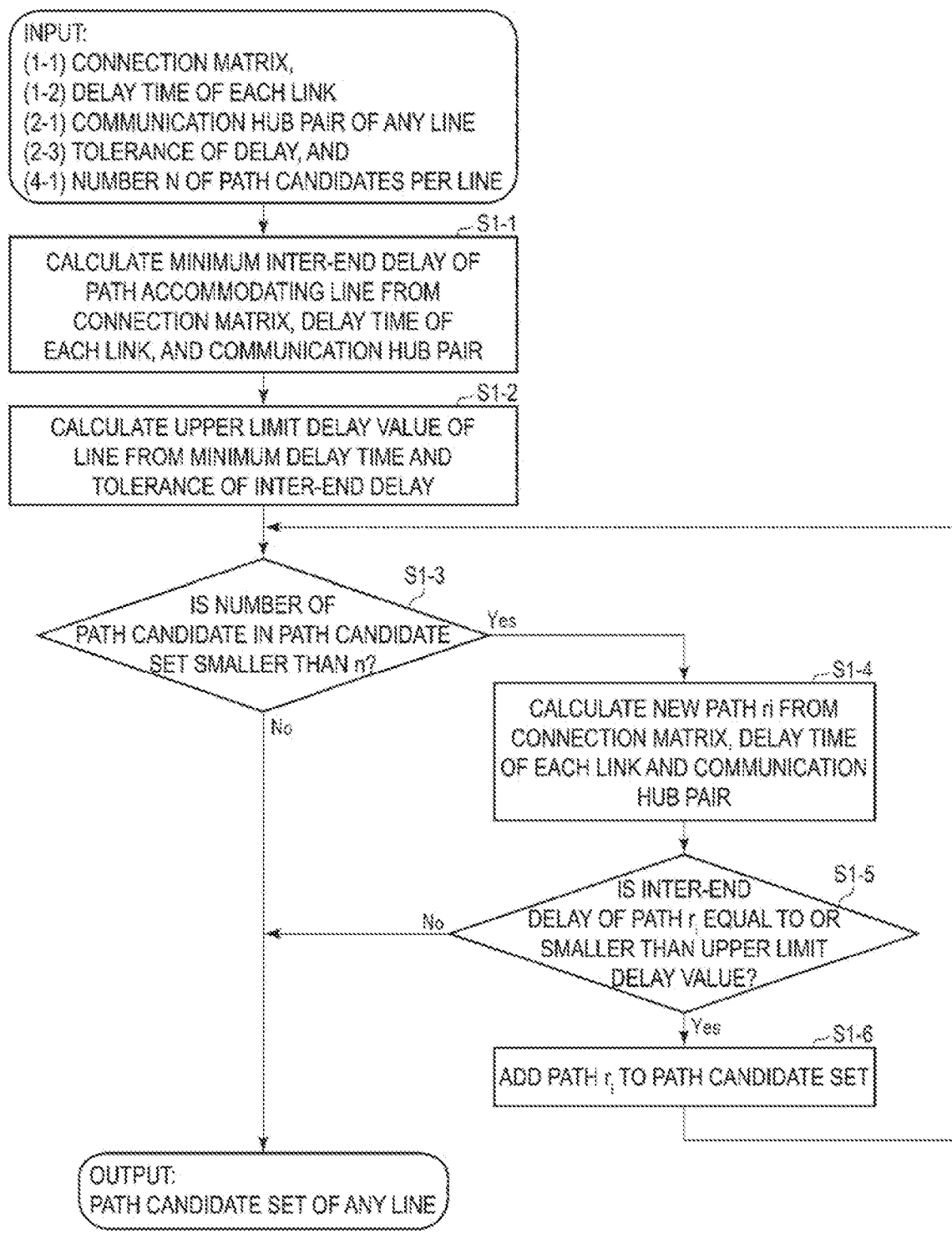
FIG. 4 is a flowchart illustrating an example of a procedure for calculating a path candidate set for any line in the first embodiment.

In the calculation of the path candidate set (S1), the calculation unit 12a of the first processing unit 12 calculates, for each line, an upper limit delay value, which is a threshold value of an inter-end delay, and the path candidate set. The upper limit delay value and the path candidate set are calculated from (1-1) the connection matrix, (1-2) the delay time of each link, (2-1) a communication hub pair, (2-3) the tolerance of the inter-end delay, and (4-1) the number of path candidates per line described above. FIG. 4 is a flowchart illustrating an example of a procedure for calculating a path candidate set for any line.

First, in S1-1, the calculation unit 12a of the first processing unit 12 calculates a minimum inter-end delay for a path accommodating any line. The minimum inter-end delay is a minimum value of the inter-end delay of the path accommodating the line. The calculation unit 12a calculates the minimum inter-end delay from (1-1) the connection matrix, (1-2) the delay time of each link, and (2-1) the communication hub pair of the line described above. For example, the calculation unit 12a creates a weighted undirected graph from (1-1) the connection matrix and (1-2) the delay time of each link. The calculation unit 12a calculates a shortest path and a sum of weights of the links in the shortest path in the created weighted undirected graph using a Dijkstra method. In this case, the sum of the weights of the links in the shortest path is calculated as the minimum inter-end delay.

Next, in S1-2, the calculation unit 12a of the first processing unit 12 calculates an upper limit delay value of the line. The calculation unit 12a calculates the upper limit delay value of the line from the minimum inter-end delay calculated in S1-1 and (2-3) the tolerance of the inter-end delay of the line. For example, when the minimum inter-end delay 1 and a numerical value i indicating the tolerance of the inter-end delay of the line have been defined, the calculation unit 12a performs calculation using 1×i as a mathematical relationship for calculating the upper limit delay value. The numerical value indicating the tolerance of the inter-end delay described above and a setting of the calculation relationship for the upper limit delay value are examples, and any value or mathematical relationship can be set according to the embodiment. Accordingly, the upper limit delay value according to the tolerance of the inter-end delay can be calculated.

Next, in S1-3, the calculation unit 12a of the first processing unit 12 performs a determination from (4-1) the number of path candidates per line. That is, the calculation unit 12a determines whether the number of path candidates already included in the path candidate set is smaller than n. When the number of path candidates already included in the path candidate set is smaller than n (S1-3: Yes), the process proceeds to S1-4. On the other hand, when the number of path candidates already included in the path candidate set is n or greater (S1-3: No), the first processing unit 12 outputs the path candidate set including the already calculated path candidates. The process of S1 ends.

In S1-4, the calculation unit 12a of the first processing unit 12 calculates a new path $r_i$. In this case, the calculation unit 12a calculates the new path $r_i$ from (1-1) the connection matrix, (1-2) the delay time of each link, and (2-1) the pair of communication hubs. Here, the calculation unit 12a calculates the new path in ascending order of the inter-end delay each time the process of S1-4 is repeated. In this case, a new path is calculated using a k-shortest path algorithm (see a reference "Jin Y. Yen," Finding the K Shortest Loopless Paths in a Network", Management Science, vol. 17, No. 11, pp. 712-716, 1971"). For example, it is assumed that a weighted graph G, a starting point s, and an ending point t have been assigned. In the k-shortest path algorithm, k paths that do not include a loop from s to t are searched for in ascending order of cost. Accordingly, in S1-4, the calculation unit 12a calculates the new path in ascending order of the inter-end delay using the k-shortest path algorithm.

Next, in S1-5, the calculation unit 12a of the first processing unit 12 calculates the inter-end delay of the path $r_i$ calculated in S1-4. The calculation unit 12a determines whether the calculated inter-end delay is equal to or smaller than the upper limit delay value calculated in S1-2. When the inter-end delay of the new path $r_i$ is equal to or smaller than the upper limit delay value (S1-5: Yes), the process proceeds to S1-6. On the other hand, when the inter-end delay of the new path $r_i$ is greater than the upper limit delay value (S1-5: No), the first processing unit 12 outputs the path candidate set including the already calculated path candidate. Thus, the new path $r_i$ calculated in S1-4 is not included in the path candidate set.

Next, in S1-6, the calculation unit 12a of the first processing unit 12 adds the path $r_i$ calculated in S1-4 to the path candidate set as one path candidate.

By S1-3 to S1-6 being performed as described above, the new path $r_i$ is added to the path candidate set as the path candidate so long as the number of path candidates in the path candidate set are smaller than n and the inter-end delay of the new path $r_i$ is equal to or smaller than the upper limit delay value. Therefore, in the path candidate set of any line output in S1, the number of path candidates is equal to or smaller than n, and the inter-end delay of each path candidate is equal to or smaller than the upper limit delay value of the line. Here, n is the number of path candidates per line (an upper limit value of the number of path candidates), and is input by the network designer, as described above.

In the embodiment, the path candidate set is calculated in each line in the procedure of S1 described above. The path candidate set of each line calculated in S1 is used as an input of S3.

Calculation of Interface Combination Candidate Set (S2)

In calculation of an interface combination candidate set (S2), the calculation unit 13a of the second processing unit 13 calculates an interface combination candidate set. The calculation unit 13a calculates the interface combination candidate set from (3-1) the traffic capacity of each interface, (3-2) the cost value of each interface, and (4-2) the number m of interface combination candidates. The calculated interface combination candidate set includes m combination candidates for an interface combination. Each combination candidate is a combination of zero or more interfaces, and in each combination candidate, a plurality of interfaces with the same traffic capacity may be overlapped and combined.

Figure 5:
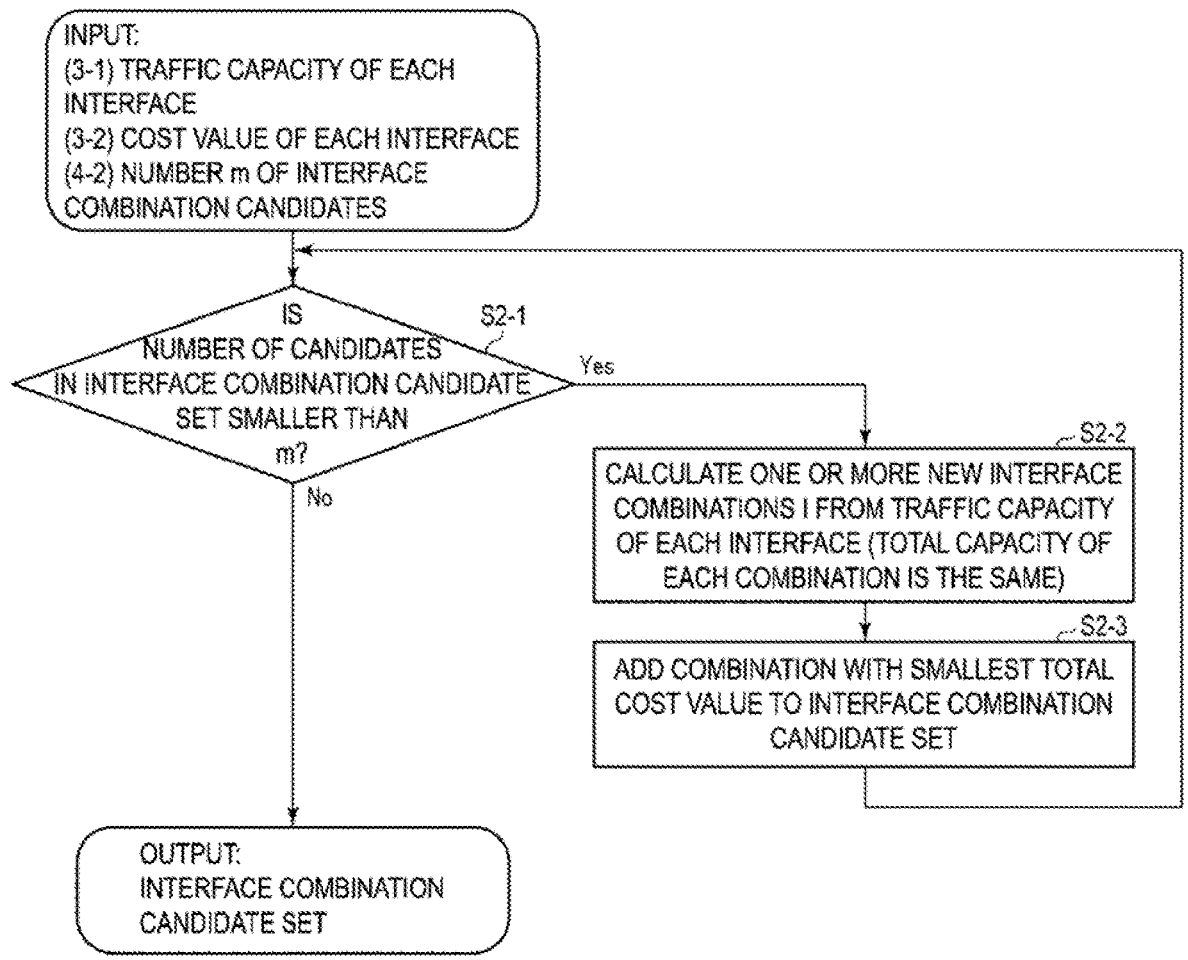
FIG. 5 is a flowchart illustrating an example of a procedure for calculating an interface combination candidate set in the first embodiment.

FIG. 5 is a flowchart illustrating an example of a procedure for calculating the interface combination candidate set.

First, in S2-1, the calculation unit 13a of the second processing unit 13 performs a determination from (4-2) the number m of interface combination candidates. That is, the calculation unit 13a determines whether the number of combination candidates already included in the interface combination candidate set is smaller than m. When the number of combination candidates already included in the combination candidate set is smaller than m (S2-1: Yes), the process proceeds to S2-2. On the other hand, when the number of combination candidates already included in the combination candidate set is equal to or greater than m (S2-1: No), the second processing unit 13 outputs the interface combination candidate set including the already calculated combination candidates.

Next, in S2-2, the calculation unit 13a of the second processing unit 13 calculates one or more new interface combinations I. The calculation unit 13a calculates the new combination I from (3-1) the traffic capacity of each interface. In this case, the calculation unit 13a may calculate a plurality of new combinations I. In the plurality of new combinations I to be calculated, however, total capacities, which are the sums of the traffic capacities of the interfaces, are the same as each other. Further, each new combination I to be calculated is a combination of zero or more interfaces, and in each combination I, a plurality of interfaces of the same type are allowed to overlap. The interfaces with the same traffic capacities correspond to the same types of interfaces. Further, each time the process of S2-2 is repeated, the calculation unit 13a calculates the new combination I in ascending order of the total capacity of the interfaces included in the combination.

Next, in S2-3, the calculation unit 13a of the second processing unit 13 selects one of the new combinations I calculated in S2-2 from (3-2) the cost value of each interface. In this case, the calculation unit 13a selects one combination in which a total cost value that is a sum of the cost values of the interfaces is smallest, from among the combinations I. The calculation unit 13a adds the one combination selected from among the combinations I to the interface combination candidate set.

By S2-1 to S2-3 being performed as described above, m combination candidates are included in the interface combination candidate set output in S2, and total capacities of the respective combination candidates are prime to each other. That is, the m combination candidates included in the interface combination candidate set differ in the total capacity of the interfaces. Further, each combination candidate is a combination of zero or more interfaces, and in each combination candidate, a plurality of interfaces of the same type are allowed to overlap. Further, each combination candidate has a candidate number. The candidate number is set to a natural number between 1 and m. When the candidate number becomes greater, the total capacity of the interfaces included in the combination increases.

In the embodiment, the interface combination candidate set is calculated in the procedure of S2 described above. The interface combination candidate set calculated in S2 is used as an input of S3.

Calculation of Optimal Network Configuration (S3)

In calculation of the optimal network configuration (S3), the calculation unit 14a of the third processing unit 14 solves the optimization problem for minimizing the objective function. In this case, the calculation unit 14a uses a variable indicating which path candidate has been selected from the path candidate set as a decision variable. The decision variables are set for each line. The calculation unit 14a uniquely determine the combination candidate of the interface to be installed in each link from the selected path candidate. Further, the calculation unit 14a uses a mathematical relationship deriving a total cost of all the interfaces as an objective function. A mathematical relationship obtained by formulating the optimization problem described above is shown below.

[Math. 3]

$$\operatorname*{argmin}_{\vec{x}} 2 \sum_{e \in E} \Phi_e \quad (1)$$

subject to, $$\sum_{i \in I^v} x_i^v = 1, \forall v \in V \quad (2)$$

$$\Phi_e = \Omega_j^{IF}, \Psi_{j-1}^{IF} < t^e \leq \Psi_j^{IF}, \forall e \in E \quad (3)$$

Further, matters indicated by, for example, parameters relevant to the relationship (1) to (3) are as follows.

[Math. 4]

L=(l): Set of Communication hubs
E=(e): Set of Links between communication hubs
V=(v): Set of lines
$\vec{x}=(x_i^v)$: line v selects path candidate i
$\Phi_e$: Cost value of link e
$I^v$: Path candidate set of line v
J: IF Combination candidate set
$\psi_j^{IF}$: Total Capacity of IF combination candidate j
$\Omega_j^{IF}$: Total cost of IF combination candidate j
$\vec{d}=(d_v)$: Contracted band of line: v
M: Connection Matrix (indicated by |L|×|E|) indicating connection form between communication hubs
$t^e$ ($\vec{x}$, $\vec{d}$, M): Sum of contracted Bands of Link e (calculated on basis of $\vec{x}$, $\vec{d}$, M)

In the optimization problem of S3, conditions for selecting one path candidate in each line are provided as a constraint. This constraint is shown in the relationship (2). Here, in the relationship (1) to (3), the variable x is a decision variable of the optimization problem. The variable x indicates, for each line, a path candidate selected as a path to be accommodated from the path candidate set. That is, in each line, the variable x changes in correspondence to which path candidate has been selected from the path candidate set.

Further, in the optimization problem of S3, the objective function is used as the total cost value of all the interfaces. The objective function is shown in the relationship (1). The objective function of the relationship (1) is calculated on the basis of the selected path candidate. Further, in the objective function of the relationship (1), $\Phi_e$ indicates the cost value per link e. The cost value $\Phi_e$ per link e is calculated from the relationship (3). The relationship (3) is a part of the objective function of the relationship (1): the relationship (3) is a mathematical relationship for determining the interface combination candidate that is disposed in the link from a sum $t^e$ of the contracted bands per link e.

In S3, the total contracted band $t^e$ of each link is calculated on the basis of the path candidates selected for each line, the total contracted band of each line, and the connection matrix indicating the connection state between the communication hubs. Here, the path candidates selected for each line are indicated by the variable x, which is a decision variable, in the relationship (1) to (3) above. Further, the contracted band of each line is included in the input information described above, and corresponds to a parameter d, which is one of the parameters relevant to the relationship (1) to (3). The connection matrix is included in the input information described above, and corresponds to a parameter M, which is one of the parameters relevant to the relationship (1) to (3). Thus, when the path candidate of each line is selected, the total contracted band $t^e$ of each link is calculated uniquely from the line information and the topology information.

In S3, the interface combination candidate of each link is uniquely derived on the basis of the calculated total contracted band $t^e$ of each link. In this case, for each link, the combination candidate capable of most efficiently accommodating the calculated total contracted band $t^e$ in the interface combination candidate set is uniquely determined. Here, for each link, a candidate number of the combination candidate capable of most efficiently accommodating the total contracted band $t^e$ in the interface combination candidate set is indicated by "j". In each link, a total capacity $\psi_j^{IF}$ of the interface in the combination candidate with a candidate number of "j" is equal to or greater than the calculated total contracted band $t^e$, as shown in the relationship (3). In each link, a total capacity $\psi_{j-1}^{IF}$ of the interface in the combination candidate with a candidate number of "j−1" is smaller than the calculated total contracted band $t^e$. The combination candidate with the candidate number of "j−1" is a combination candidate in which the total capacity of the interface is next smallest after the combination candidate with the candidate number of "j" in the interface combination candidate set.

Thus, in the derivation of the interface combination candidate based on the total contracted band $t^e$ in each link, a condition is that the total capacity $\psi_j^{IF}$ of the interface in the derived combination candidate is equal to or greater than the calculated total contracted band $t^e$. Further, in the derivation of the interface combination candidate based on the total contracted band $t^e$ in each link, a condition is that the total capacity $\psi_{j-1}^{IF}$ of the interface is smaller than the calculated total contracted band $t^e$ in a combination candidate with a next smallest total capacity of the interfaces after the combination candidate derived in the combination candidate set. The interface combination candidate for each link is derived as described above. Therefore, when one path candidate is selected for each line, an interface combination candidate corresponding to the selected path candidate is derived uniquely for each link in S3.

In S3, a total cost value se of the interface included in the combination candidate with the candidate number of "j" derived as described above is calculated for each link, as shown in the relationship (3). In S3, a sum of the total cost values calculated for the respective links is used as an objective function, as shown in the relationship (1). That is, the sum of the cost values in all the links is used as the objective function. The optimization problem for minimizing the objective function is solved. In the calculation of the total cost values of all the interfaces, which are the objective function, the total cost value of the interface combination candidate derived uniquely for each link is calculated. The total cost values of all the links are summed, and a value obtained by doubling the sum is used as a value of the objective function. Doubling the sum is because the uniquely derived interface combination candidates are connected to both ends of each link.

Path candidates of each line that minimize the sum of the cost values in all the links are derived by solving the optimization problem described above. That is, an optimal decision variable x is derived for each line. The derived path candidates of each line are optimal path candidates of each line. Further, in S3, an interface combination candidate in each link is uniquely derived as described above from the optimal path candidates of each line. In each link, the interface combination candidate derived uniquely from the optimal path candidate of each line is an optimal combination candidate.

The calculation unit 14a of the third processing unit 14 calculates the optimal path candidate of each line and the optimal interface combination candidate of each link portion at each communication hub by solving the optimization problem, as described above. The third processing unit 14 outputs the calculated optimal path candidate and the calculated optimal interface combination candidate to the output unit 15.

By S3 being performed, interface combination candidates that can be most efficiently accommodated for each link is determined on the basis of selection of the path candidate of each line. Thus, in the optimization problem, only the selection of the path candidate can be used as a decision variable.

Further, by S3 being performed, the interface combination in each link capable of accommodating the total contracted band $t^e$ is determined in the objective function of the optimization problem. Therefore, there is no need to provide capacity conditions as constraints of the optimization problem.

In S3, the total contracted band $t^e$ of each link is calculated from the path candidates of each line, and the interface combination candidates for each link are uniquely derived on the basis of the calculated total contracted band $t^e$ of each link. In this case, the interface combination candidate of each link is uniquely derived so that the above-described conditions regarding the total contracted band $t^e$ are satisfied. Thus, an appropriate interface combination candidate corresponding to the selected path candidate of each line is uniquely derived for each link (each link portion).

Operational Example

An operation example of the first embodiment divided into an example of input information and an operation example of each process will be described.

Example of Input Information

Topology Information

Figure 6:
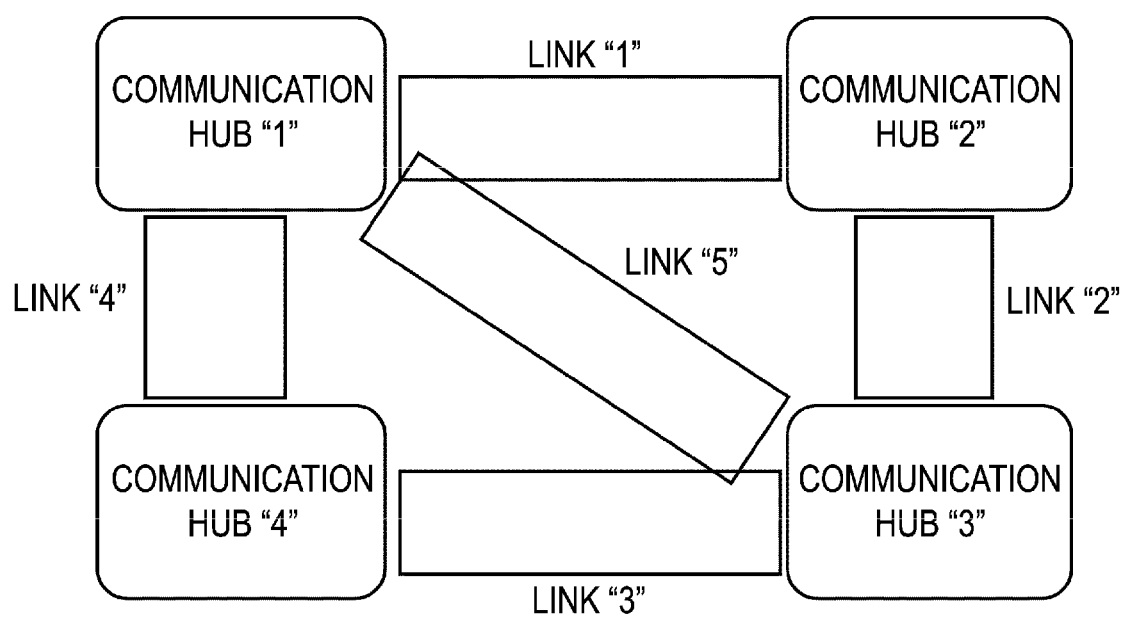
FIG. 6 is a schematic diagram illustrating an example of a topology in an operation example of the first embodiment.
Figure 7:
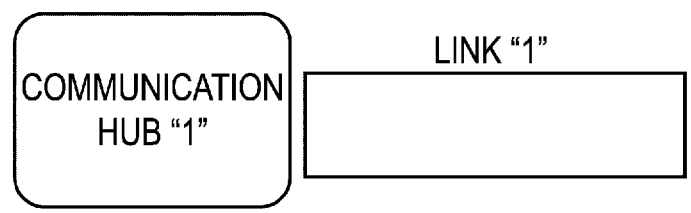
FIG. 7 is a schematic diagram illustrating a model example for use in the example of the topology of FIG. 6.

FIG. 6 is a diagram illustrating an example of the topology. FIG. 7 is a diagram illustrating a model example for use in the example of the topology in FIG. 6. That is, FIG. 7 is a diagram illustrating, for example, symbols used in the example in FIG. 6. In FIG. 7, communication hub "1" indicates a communication hub with the communication hub number of 1. Further, in FIG. 7, link "1" indicates a link with a link number of 1 and is connected to communication hub "1".

FIG. 6 illustrates a connection state between communication hubs. Specifically, a connection state of communication hubs corresponding to communication hubs "1" to "4" via link "1" to link "5" is shown. The connection matrix M indicating the connection state between the communication hubs in the example of FIG. 6 is shown in a mathematical relationship (A) below.

[Math. 5]

$$M = \begin{pmatrix} 1 & 0 & 0 & 1 & 1 \\ 1 & 1 & 0 & 0 & 0 \\ 0 & 1 & 1 & 0 & 1 \\ 0 & 0 & 1 & 1 & 0 \end{pmatrix} \quad (A)$$

In the connection matrix M, each row corresponds to a communication hub, and each column corresponds to a link. When the link is connected to the communication hub, "1" is stored in a corresponding portion of the connection matrix M. On the other hand, when the link is not connected to the communication hub, "0" is stored in the corresponding portion of the connection matrix M.

Further, an example of the delay time in each link is shown as the topology information in Table 1 below. In Table 1, a delay time between the communication hubs is shown.

TABLE 1

| Link No. | Delay time |
|---|---|
| 1 | 2 |
| 2 | 1 |
| 3 | 2 |
| 4 | 1 |
| 5 | 4 |

Line Information

Next, an example of information on the line accommodated in the network is shown in Table 2 below.

TABLE 2

| Line No. | Communication hub pair | Contracted band | Tolerance of inter-end delay |
|---|---|---|---|
| 1 | 1, 3 | 10 | 1 |
| 2 | 1, 3 | 10 | 1 |
| 3 | 1, 3 | 10 | 0 |
| 4 | 1, 3 | 10 | 0 |

In an example of Table 2, in line "1" with the line number of "1", communication of a contracted band "10" is performed between communication hub "1" and communication hub "3". Line "1" has the tolerance of the inter-end delay of "0". Here, in the example of Table 2, the tolerance of the inter-end delay is set to a value of 0 or 1. In this example, when the tolerance of the inter-end delay is 1, the tolerance is determined to be high, and a delay time of twice the inter-end delay of the shortest path is set as the upper limit delay value. On the other hand, when the tolerance is 0, the tolerance is determined to be low, and the inter-end delay of the shortest path is set as the upper limit delay value.

Apparatus Information

Next, an example of information on a switch that is a transfer apparatus (network apparatus) disposed at the communication hub and an interface (link portion apparatus) installed in the link portion of the switch will be described.

Figure 8:
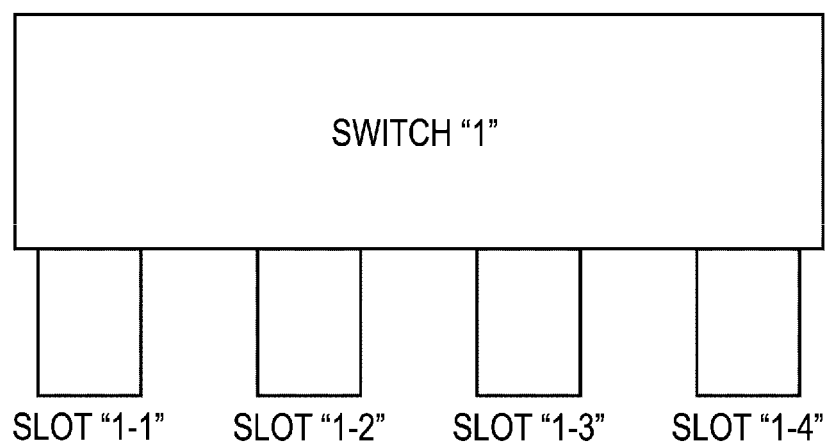
FIG. 8 is a schematic diagram illustrating an example of a switch in the operation example of the first embodiment.

FIG. 8 illustrates an example of the switch. The switch in the example of FIG. 8 is a switch "1" with a switch number "1" and includes a slot "1-1", a slot "1-2", a slot "1-3", and a slot "1-4". The switch "1" receives data in which a destination is indicated. The switch "1" determines a slot to output the data on the basis of the destination indicated in the data. Accordingly, a link that outputs the data is determined.

The slot corresponds to a connection portion (link connection portion) between a communication hub and the link. Further, the slot accommodates an interface.

Figure 9:
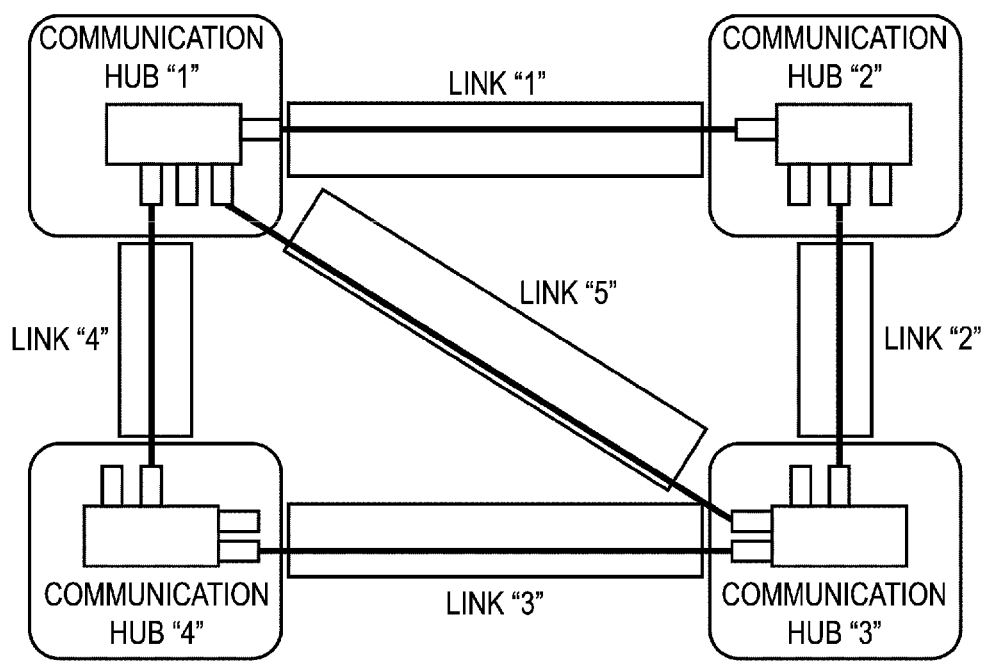
FIG. 9 is a schematic diagram illustrating an example of disposition of switches in an infrastructure network illustrated in FIG. 6.

FIG. 9 illustrates an example of disposition of switches in the infrastructure network illustrated in FIG. 6. Thus, in FIG. 9, an example of a method of connecting switches in the topology of FIG. 6 is shown. In an example of FIG. 9, a switch is installed in communication hubs "1" to "4". The slots of each switch are connected by a cable via a link, and the respective communication hubs are connected.

Next, an example of information on the switch is shown in Table 3 below.

TABLE 3

| Transfer apparatus | Number of slots | Traffic capacity per slot |
|---|---|---|
| Switch "1" | 4 | 100 Gbit/s |
| Switch "2" | 8 | 100 Gbit/s |
| Switch "3" | 16 | 100 Gbit/s |

In an example of Table 3, information on switches with switch numbers of "1" to "3" is shown. In the example of Table 3, switch "1" with the switch number of "1" includes four slots. Further, in switch "1", a total amount of traffic capacity that can be processed is 400 Gbit/s because a traffic capacity per slot is 100 Gbit/s. The total amount of traffic capacity is a sum of the traffic capacities of the slots provided in the switch.

Further, an example of information on the interface is shown in Table 4 below.

TABLE 4

| Link portion apparatus | Traffic capacity | Cost value | Capacity |
|---|---|---|---|
| Interface "1" | 10 Gbit/s | 1 | 1 per slot |
| Interface "2" | 40 Gbit/s | 3 | 1 per slot |
| Interface "3" | 100 Gbit/s | 5 | 1 per slot |

In the example of Table 4, information on interfaces with interface numbers of "1" to "3" is shown. In the example of Table 4, in interface "1" with the interface number of "1", a traffic capacity that can be processed is 10 Gbit/s. One interface "1" can be installed in one slot and has a cost value of 1.

Design Parameter Information

An example of the design parameter information is shown in Table 5 below. In the example of Table 5, the design parameter information includes the number of path candidates per line (an upper limit value of the number of path candidates), and the number of interface combination candidates (a design value of the number of combination candidates). Further, the number of switch combination candidates may also be included in the design parameter information.

TABLE 5

| | |
|---|---|
| Number of path candidates per line | 3 |
| Number of interface combination candidates | 10 |

Example of Operation of Each Process

Calculation of Path Candidate Set (S1)

First, in S1-1, a minimum inter-end delay of each line is calculated. Table 6 below shows an example of a minimum inter-end delay of each line. In Table 6, for example, a minimum inter-end delay when the input information described above in the operation example has been input is shown.

TABLE 6

| Line No. | Communication hub pair | Minimum inter-end delay |
|---|---|---|
| 1 | 1, 3 | 3 |
| 2 | 1, 3 | 3 |
| 3 | 1, 3 | 3 |
| 4 | 1, 3 | 3 |

In an example of Table 6, in a communication hub pair of communication hub "1" and communication hub "3", the inter-end delay has a minimum value in a path passing through link "1", communication hub "2", and link "2" and a path passing through link "4", communication hub "4", and link "3". Thus, the inter-end delay in the path passing through link "1", communication hub "2", and link "2" or the inter-end delay in the path passing through link "4", communication hub "4", and link "3" is set as the minimum inter-end delay. From Table 1 described above, the delay time of link "1" is 2, and the delay time of link "2" is 1. Thus, the inter-end delay in the path passing through link "1", communication hub "2", and link "2" becomes "2+1=3".

Next, in S1-2, the upper limit delay value of each line is calculated. Table 7 below shows an example of the upper limit delay value of each line. In Table 7, for example, the upper limit delay value when the input information described above in the operation example is input and the minimum inter-end delay is calculated as in Table 6 of the operation example is shown.

TABLE 7

| Line No. | Communication hub pair | Tolerance of inter-end delay | Minimum inter-end delay | Upper limit delay value |
|---|---|---|---|---|
| 1 | 1, 3 | 1 | 3 | 6 |
| 2 | 1, 3 | 1 | 3 | 6 |
| 3 | 1, 3 | 0 | 3 | 3 |
| 4 | 1, 3 | 0 | 3 | 3 |

In an example of Table 7, line "1" and line "2" with the tolerance of the inter-end delay of 1 are determined to be high in the tolerance. Therefore, in line "1" and line "2", a delay time twice the minimum inter-end delay is set as the upper limit delay value, and the upper limit delay value is 6. On the other hand, line "3" and line "4" with the tolerance of the inter-end delay of 0 are determined to be low in the tolerance. Therefore, in line "3" and line "4", the minimum inter-end delay is set as the upper limit delay value, and the upper limit delay value is 3.

Next, in S1-3 to S1-6, path candidates in each line are calculated. When input information indicating an example of the input information is input, the path candidates are calculated on the basis of the number of path candidates of 3 per line set in Table 5. Thus, in each line, a maximum of three path candidates are calculated. Table 8 below shows an example of path candidates of each line to be calculated, and shows an example of the path candidate set. In Table 8, for example, the path candidate set when the input information described above is input in the operation example and the upper limit delay value is calculated as in Table 7 of the operation example is shown.

TABLE 8

| Line No. | Upper limit delay value | Path candidate | Use link |
|---|---|---|---|
| 1 | 6 | 1-1 | Link "1", link "2" |
|   |   | 1-2 | Link "3", link "4" |
|   |   | 1-3 | Link "5" |
| 2 | 6 | 2-1 | Link "1", link "2" |
|   |   | 2-2 | Link "3", link "4" |
|   |   | 2-3 | Link "5" |
| 3 | 3 | 3-1 | Link "1", link "2" |
|   |   | 3-2 | Link "3", link "4" |
|   |   | 3-3 | — |
| 4 | 3 | 4-1 | Link "1", link "2" |
|   |   | 4-2 | Link "3", link "4" |
|   |   | 4-3 | — |

In an example of Table 8, line "1" has an upper limit delay value of "6". Thus, in line "1", path "1-1" and "1-2" with the inter-end delay of "3" and path "1-3" with the inter-end delay of "4" are path candidates. On the other hand, line "3" has the upper limit delay value of "3". Thus, in line "3", only paths "3-1" and "3-2" with the inter-end delay of "3" are path candidates.

Calculation of Interface Combination Candidate Set (S2)

Table 9 below shows an example of an interface combination candidate set to be calculated. In Table 9, for example, the interface combination candidate set when the input information described above is input in the operation example is shown.

TABLE 9

| Candidate No. of interface combination candidate | Combination | Total Capacity | Total cost value |
|---|---|---|---|
| 1 | — | 0 | 0 |
| 2 | Interface "1" | 10 | 1 |
| 3 | Interface "1" * 2 | 20 | 2 |
| 4 | Interface "1" * 3 | 30 | 3 |
| 5 | Interface "2" | 40 | 3 |
| 6 | Interface "2", interface "1" * 1 | 50 | 4 |
| 7 | Interface "2", interface "1" * 2 | 60 | 5 |
| 8 | Interface "2", interface "1" * 3 | 70 | 6 |
| 9 | Interface "2" * 2 | 80 | 6 |
| 10 | Interface "2" * 2, interface "1" * 1 | 90 | 7 |

In the calculation of the interface combination candidate set, one or more new combinations of interfaces are calculated each time S2-2 is repeated. In S2-2, a total capacity of interfaces included in the new combination to be calculated is different each time, and a new combination is calculated in ascending order of the total capacity each time the process of S2-2 is repeated. Therefore, in S2-2, the interfaces included in the new combination to be calculated form different combinations each time.

For example, a case in which combinations of interfaces with a total capacity of "40 Gbit/s" are calculated in S2-2 will be described. In this case, a combination in which four interfaces with a capacity of "10 Gbit/s" are included, and a combination in which one interface with a capacity of "40

Gbit/s" is included are calculated as the combinations of interfaces with a total capacity of "40 Gbit/s".

In S2-3, the total cost value of the combination calculated in S2-2 is calculated. Here, the total cost value of the combination in which four interfaces with a capacity of "10 Gbit/s" are included is "1*4=4", and the total cost value of the combination in which one interface with a capacity of "40 Gbit/s" is included is "3*1=3". That is, the combination in which one interface with a capacity of "40 Gbit/s" is included among the combinations calculated in S2-2 has the smallest total cost value. Thus, in S2-3, a combination including one interface with a capacity of "40 Gbit/s" is added to the interface combination candidate set as a combination candidate.

When the input information described above is input in the operation example, the process of S2-1 is performed on the basis of the number of interface combination candidates set in Table 5 of 10. That is, it is determined in S2-1 whether the number of calculated combination candidates is smaller than 10. Thereby, 10 combination candidates with different total capacities are calculated for the combination of interfaces. Further, candidate numbers "1" to "10" are set for the combination candidates.

Calculation of Optimal Network Configuration (S3)

In S3, the optimization problem described above is solved. Table 10 shows an example of the optimal path candidates of each line calculated in the optimization problem. For example, when S1 and S2 have been performed as described above in the operation example, the optimal path candidate of each line is calculated as in Table 10.

TABLE 10

| Line No. | No. of selected path candidate |
| --- | --- |
| 1 | 1-1 |
| 2 | 2-1 |
| 3 | 3-1 |
| 4 | 4-1 |

That is, when S1 and S2 have been performed as described above in the operation example, path "1-1" is calculated as the optimal path candidate for line "1", path "2-1" is calculated as the optimal path candidate for line "2", path "3-1" is calculated as the optimal path candidate for line "3", and path "4-1" is calculated as the optimal path candidate for line "4".

Further, in S3, the total contracted band $t^e$ of each link is calculated on the basis of the selected path candidates of each line. For each link, the interface combination candidate corresponding to the path candidate of each line is derived uniquely on the basis of the calculated total contracted band $t^e$. Thus, when the optimal path candidate of each line is calculated, the interface combination candidate of each link corresponding to the optimal path candidate of each line is uniquely derived as the optimal interface combination candidate of each link. Table 11 illustrates an optimal interface combination candidate of each link that is derived in the optimization problem. For example, when the input of the input information and the processes of S1 and S2 are performed as described above in the operation example, and the optimal path candidate of each line is calculated as in Table 10 of the operation example, the optimal interface combination candidate shown in Table 11 is derived uniquely for each link.

TABLE 11

| Link No. | Total contracted band $t^e$ | Candidate No. of interface combination candidate |
| --- | --- | --- |
| 1 | 40 | 5 |
| 2 | 40 | 5 |
| 3 | 0 | 1 |
| 4 | 0 | 1 |
| 5 | 0 | 1 |

When the optimal path candidate shown in Table 10 has been selected as a path candidate in each line, the total contracted band $t^e$ of each link is as in Table 11. For example, in link "1", the total contracted band $t^1$ is "10+10+10+10=40 Gbit/s". In link "3", the total contracted band $t^3$ is "0+0+0+0=0 Gbit/s".

When the total contracted band $t^e$ of each link is calculated as in Table 11, the interface combination candidate of each link is uniquely derived as shown in Table 11. Here, from Table 9, the total capacity $\psi_5^{IF}$ of the interfaces is 40 Gbit/s in the interface combination candidate with the candidate number of "5". In the interface combination candidate with the candidate number of "4" having a next smallest total capacity after the interface combination candidate with the candidate number of "5" in the combination candidate set, the total capacity $\psi_4^{IF}$ of the interfaces is 30 Gbit/s. Thus, the total capacity $\psi_5^{IF}$ of the interfaces in the combination candidate with the candidate number of "5" is equal to or greater than the total contracted band $t^1$ of link "1". The total capacity $\psi_4^{IF}$ of the interfaces in the combination candidate with the candidate number of "4" is smaller than the total contracted band $t^1$ of link "1". Thus, in link "1", the combination candidate with the candidate number of "5" is derived as the interface combination candidate. In link "1", the combination candidate with the candidate number of "5" becomes an optimal interface combination candidate.

Further, from Table 9, in the interface combination candidate with the candidate number of "1", the total capacity $\psi_1^{IF}$ of the interfaces is 0 Gbit/s. Thus, the total capacity $\psi_1^{IF}$ of the interfaces in the combination candidate with the candidate number of "1" is equal to or greater than the total contracted band $t^3$ of link "3". Thus, in link "3", the combination candidate with the candidate number of "1" is derived as the interface combination candidate. In link "3", the combination candidate with the candidate number of "1" becomes the optimal interface combination candidate.

Further, when the optimal path candidate of each line has been calculated as in Table 10 and the optimal interface combination candidate of each link is uniquely derived as in Table 11, a sum of the cost values of the interfaces for all the links is as follows. That is, the total cost value of all the interfaces of the network, which is the objective function, is "2*(3+3+0+0+0)=12", which is a minimum value.

Figure 10:
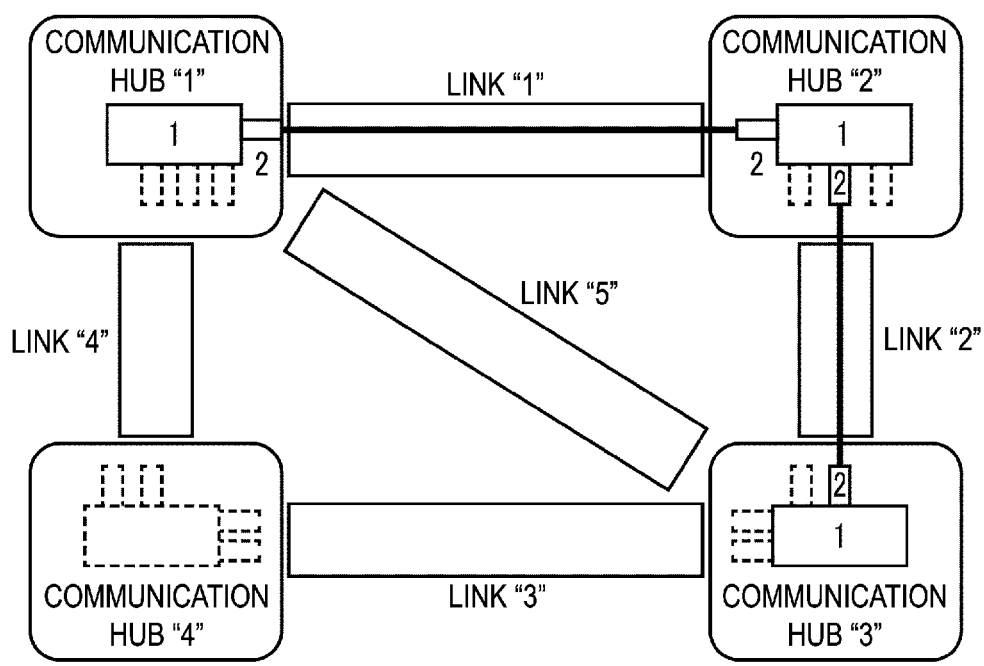
FIG. 10 is a schematic diagram illustrating an example of an optimal disposition example in a network in the operation example of the first embodiment.

An optimal network configuration, that is, an optimal disposition example in the network is generated on the basis of the optimal path candidates of each line and the optimal interface combination candidates of each link derived as described above, and is output. FIG. 10 illustrates an example of an optimal disposition in the network. FIG. 10 illustrates an example of a disposition when the optimal path candidate of each line has been calculated as in Table 10 and the optimal interface combination candidate of each link is uniquely derived as in Table 11.

In the optimal disposition example illustrated in FIG. 10, the transfer apparatuses may be disposed only at the communication hubs "1" to "3", and the transfer apparatus may not be disposed at the communication hub "4". In each of communication hubs "1" to "3", one interface of a type of interface "2" with the traffic capacity of 40 Gbit/s is installed only in the link portions of links "1" and "2". The interface is not installed in the link portions of links "3" to "5".

Operations and Effects

Here, (4-1) the number of path candidates per line is set to 3, and (4-2) the number of interface combination candidates is set to 10, for a setting of the design parameter information, as in the operation example described above. It is assumed that there are four lines and five links in the infrastructure network, as in the operation example described above.

A comparative example in which, when the input information or the like is set as described above, both the path candidate of each line and the interface combination candidate of each link can be selected is considered. In the comparative example, both a variable indicating the selected path candidate in each line and a variable indicating the selected interface combination candidate in each link are variable decision variables in the optimization problem. Thus, in the comparative example, a configuration that the network can take in optimization calculation is a "$3^4 \times 10^5 = 8100000$" pattern. Further, a configuration of a network satisfying the capacity conditions and minimizing the objective function needs to be derived from the network configuration of the "8100000" pattern. In the comparative example, the optimization problem is solved, as in S'3 of NPL 1.

On the other hand, in the embodiment, only path candidates of each line can be selected. That is, only the variable indicating the selected path candidate in each line is the variable decision variable in the optimization problem. Thus, when the input information or the like is set as described above, the configuration that the network can take in the optimization calculation is a "$3^4=81$" pattern, and the number of patterns in the configuration that the network can take is greatly reduced from the comparative example. A configuration minimizing the objective function is derived from the network configuration of the "81" pattern.

Accordingly, in the embodiment, it is possible to reduce a search range by reducing the number of decision variables in the optimization problem. This allows a computation time to be shortened.

A scheme described in each embodiment is stored in a recording medium such as a magnetic disk (a Floppy (registered trademark) disk, a hard disk, or the like), an optical disc (a CD-ROM, a DVD, an MO, or the like), a semiconductor memory (a ROM, a RAM, a flash memory, or the like) or transferred by a communication medium for distribution, as a program (a software means) that can be executed by a calculator (a computer). The program stored in the medium also includes a setting program for causing a software means (including not only an execution program but also a table or data structure), which will be executed in a calculator, to be configured within the calculator. A calculator implementing the present apparatus executes the above-described process by loading the program recorded on the recording medium or constructing a software means using the setting program in some cases, and controlling an operation using the software means. The recording medium referred to herein is not limited to a recording medium for distribution, and includes a storage medium such as a magnetic disk or a semiconductor memory provided inside the calculator or in a device connected via a network.

Further, the present invention is not limited to the embodiments, and it is possible to make various modifications without departing from the gist of the present invention.

Further, the embodiments may be implemented in appropriate combination, and in this case, effects of the combination can be obtained. Further, various inventions are included in the above embodiment and can be extracted by a combination in a plurality of configuration requirements that are disclosed.

REFERENCE SIGNS LIST

10 Network design apparatus
11 Input unit
12 First processing unit
13 Second processing unit
14 Third processing unit
12a, 13a, 14a Calculation unit
15 Output unit

The invention claimed is:

1. A network design apparatus for designing a network configuration for a network in which a switch is disposed at each of a plurality of communication hubs and the communication hubs are connected by lines via slots of the switches, the network design apparatus comprising:
   a processor; and
   a storage medium having computer program instructions stored thereon, when executed by the processor, perform to:
   receive an input of topology information on a connection state between the communication hubs, line information regarding a plurality of lines accommodated in the network, apparatus information regarding the switch disposed at the communication hub and the slots in the switch, and design parameter information regarding parameters used in the design;
   calculate a first candidate sets for the lines on the basis of the topology information, the line information, and the design parameter information;
   calculate second candidate sets for the slots on the basis of the apparatus information and the design parameter information;
   calculate an optimal candidate of each of the lines minimizing a total cost value in the overall network on the basis of the first candidate sets for the lines and the second candidate sets for the slots, wherein calculating the optimal candidate includes calculating a total contracted band of each of the lines on the basis of the line information, the topology information, and the selected optimal candidate of each of the lines, and uniquely deriving the second candidate set of slots for each of the lines on the basis of the calculated total contracted band of each of the lines; and
   generate network configuration information reflecting both the optimal candidate of each of the lines and the second candidate sets of slots for each of the lines uniquely derived from the optimal candidate of each of the lines;
   wherein the second candidate sets for the slots is calculated with different total capacities for each candidate set in the second candidate sets, and uniquely derives the second candidate sets of slots for each of the lines on condition that the total capacity of the slots in the second candidate sets of slots for each of the lines is equal to or greater than the calculated total contracted band, and that the total capacity of the slots in the second candidate sets of slots for each of the lines has smallest total capacity from amongst combination candidates having total capacity of the slots link portion apparatus that is greater than the calculated total contract band.

2. A non-transitory computer readable medium which store a network design processing program for designing a network configuration for a network in which a switch is disposed for each of a plurality of communication hubs and the communication hubs are connected by lines via slots of the switches, the network design processing program causing a processor to acquire topology information on a connection state between the communication hubs, line information regarding a plurality of lines accommodated in the network, apparatus information regarding the switch disposed at the communication hub and the slots of the switch, and design parameter information regarding parameters used in the design;

calculate a first candidate sets for the lines on the basis of the topology information, the line information, and the design parameter information;

calculate second candidate sets for the slots on the basis of the apparatus information and the design parameter information;

calculate an optimal candidate of each of the lines minimizing a total cost value in the overall network on the basis of first candidate sets for the lines and the second candidate sets for the slots, wherein calculating the optimal candidate includes calculating a total contracted band of each of the lines on the basis of the line information, the topology information, and the selected optimal candidate of each of the lines, and uniquely deriving the second candidate set of slots for each of the lines on the basis of the calculated total contracted band of each of the lines; and generate network configuration information reflecting both the calculated optimal candidate of each of the lines and the second candidate sets of slots for each of the lines uniquely derived from the optimal candidate of each of the lines;

wherein the second candidate sets for the slots is calculated with different total capacities for each candidate set in the second candidate sets, and uniquely derives the second candidate sets of slots for each of the lines on condition that the total capacity of the slots in the second candidate sets of slots for each of the lines is equal to or greater than the calculated total contracted band, and that the total capacity of the slots in the second candidate sets of slots for each of the lines has smallest total capacity from amongst combination candidates having total capacity of the slots link portion apparatus that is greater than the calculated total contract band.

3. A network design method for designing a network configuration for a network in which a switch is disposed for each of a plurality of communication hubs and the communication hubs are connected by lines via slots of the switches, the network design method comprising:

acquiring topology information on a connection state between the communication hubs, line information regarding a plurality of lines accommodated in the network, apparatus information regarding the switch disposed at the communication hub and the slots in the switch, and design parameter information regarding parameters used in the design;

calculating first candidate sets for the lines on the basis of the topology information, the line information, and the design parameter information;

calculating second candidate sets for the slots on the basis of the apparatus information and the design parameter information;

calculating an optimal candidate of each of the lines minimizing a total cost value in the overall network on the basis of first candidate sets for the lines and the second candidate sets for the slots, wherein calculating the optimal candidate includes calculating a total contracted band of each of the lines on the basis of the line information, the topology information, and the selected optimal candidate of each of the lines, and uniquely deriving the second candidate set of slots for each of the lines on the basis of the calculated total contracted band of each of the lines; and generating network configuration information reflecting both the calculated optimal candidate of each of the lines and the second candidate sets of slots for each of the lines uniquely derived from the optimal candidate of each of the lines;

wherein the second candidate sets for the slots is calculated with different total capacities for each candidate set in the second candidate sets, and uniquely derives the second candidate sets of slots for each of the lines on condition that the total capacity of the slots in the second candidate sets of slots for each of the lines is equal to or greater than the calculated total contracted band, and that the total capacity of the slots in the second candidate sets of slots for each of the lines has smallest total capacity from amongst combination candidates having total capacity of the slots link portion apparatus that is greater than the calculated total contract band.

4. The network design apparatus according to claim 1 wherein the line information includes a contracted band for each line.

5. The network design apparatus according to claim 1 wherein the line information includes an inter-end delay for each line.

6. The non-transitory computer readable medium according to claim 2 wherein the line information includes a contracted band for each line.

7. The non-transitory computer readable medium according to claim 2 wherein the line information includes an inter-end delay for each line.

8. The network design method according to claim 3 wherein the line information includes a contracted band for each line.

9. The network design method according to claim 3 wherein the line information includes an inter-end delay for each line.

* * * * *